US008565091B2

(12) United States Patent
Pongracz et al.

(10) Patent No.: US 8,565,091 B2
(45) Date of Patent: Oct. 22, 2013

(54) DYNAMIC CONTROL OF AIR INTERFACE THROUGHPUT (75) Inventors: Gergely Pongracz, Budapest (HU); Zoltan Richard Turanyi, Szentendre (HU); Sandor Racz, Cegled (HU); Szilveszter Nadas, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 372 days.

(21) Appl. No.: 12/914,161

(22) Filed: Oct. 28, 2010

(65) Prior Publication Data
US 2012/0106338 A1    May 3, 2012

(51) Int. Cl.
H04L 12/26    (2006.01)

(52) U.S. Cl.
USPC .......... 370/235; 370/229; 370/230; 370/252; 370/328

(58) Field of Classification Search
None
See application file for complete search history.

(56) References Cited

U.S. PATENT DOCUMENTS

| 6,400,695 | B1* | 6/2002 | Chuah et al. | 370/310 |
| 7,626,989 | B2* | 12/2009 | Raitola et al. | 370/395.41 |
| 8,284,786 | B2* | 10/2012 | Mirandette et al. | 370/401 |
| 2004/0246957 | A1* | 12/2004 | Grimminger | 370/389 |
| 2006/0034239 | A1* | 2/2006 | Abeta et al. | 370/341 |
| 2006/0223585 | A1* | 10/2006 | Legg | 455/560 |
| 2007/0121542 | A1* | 5/2007 | Lohr et al. | 370/329 |
| 2010/0067400 | A1 | 3/2010 | Dolganow et al. | |
| 2011/0202926 | A1* | 8/2011 | Chambliss | 718/104 |
| 2011/0235519 | A1* | 9/2011 | Racz et al. | 370/238 |
| 2011/0305138 | A1* | 12/2011 | Huomo et al. | 370/230 |

FOREIGN PATENT DOCUMENTS

| EP | 1 523 134 A1 | 4/2005 |
| EP | 1 998 512 A1 | 12/2008 |
| WO | WO 02/19619 A2 | 3/2002 |
| WO | WO 2004/088698 A2 | 1/2004 |
| WO | WO 2006/071155 A1 | 7/2006 |
| WO | WO 2006/103136 A1 | 10/2006 |

* cited by examiner

Primary Examiner — Andrew Chriss
Assistant Examiner — John Lequang (57) ABSTRACT A system, method, and network node for dynamically controlling throughput over an air interface between a mobile terminal and a radio telecommunication system. A Gateway GPRS Service Node (GGSN) receives a plurality of traffic flows for the mobile terminal and uses a Deep Packet Inspection (DPI) module to determine a target delay class for each traffic flow. The GGSN signals the target delay class of each traffic flow to a Radio Network Controller (RNC) utilizing per-packet marking within a single radio access bearer (RAB). The RNC defines a separate virtual queue for each delay class on a per-RAB basis, and instructs a Node B serving the mobile terminal to do the same. The Node B services the queues according to packet transmission delays associated with each queue. A flow control mechanism in the Node B sets a packet queue length for each queue to optimize transmission performance.

26 Claims, 4 Drawing Sheets

DYNAMIC CONTROL OF AIR INTERFACE THROUGHPUT

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to radio telecommunication systems. More particularly, and not by way of limitation, the present invention is directed to a system and method for dynamically controlling throughput over the air interface between a mobile terminal and a radio telecommunication network.

The length of the packet queue (PQ) in a Node-B (base station) is handled by High-Speed Downlink Packet Access (HSDPA) flow control (FC). The flow control process contends with two somewhat contradictory goals: (1) keep the PQ length short for low delay (low latency), which is good for time-sensitive traffic; and (2) keep the PQ length long enough to avoid under-utilization of the available radio bearer, as when there is an empty PQ buffer while there are packets waiting in the Radio Network Controller (RNC).

The existing HSDPA FC algorithm tries to fulfill both requirements by dynamically setting the shaping rate of the packet flow in the RNC. The shaping rate is set relative to a target delay according to the following algorithm:

If the estimated delay (PQ length) is smaller than the target delay, then HSDPA FC increases the shaper bit rate; and If the estimated PQ length is larger than the target delay, then the HSDPA FC decreases the shaper bit rate.

Performance of the Uu interface between the mobile terminal and the Node B depends highly on the target delay selected by the HSDPA FC algorithm.

The main problem with the existing HSDPA FC algorithm is that there is no target delay that is optimal for all types of traffic. Delay-sensitive traffic (for example, online gaming traffic) requires a very small target delay, while "throughput oriented" traffic (for example, downloading a large file) should use a higher target delay to avoid underutilization of the available radio resource. The existing HSDPA FC algorithm adjusts the shaper bit rate to match the target delay set by the operator, but it does not change the target delay. When a user utilizes services from both types, preference is usually given to the delay-sensitive traffic. It is acceptable if the download speed drops, for example 20 percent, but delay of online gaming traffic is far less tolerable.

BRIEF SUMMARY OF THE INVENTION

The present invention dynamically selects a target delay according to the type of service being utilized. Whenever a user activates a delay-sensitive service, the target delay is dynamically changed to a smaller value to reduce latency. If a user terminates all delay-sensitive services, the target delay is dynamically changed to a larger value to maximize download speed. This satisfies the normal user preference not to have the delay-sensitive traffic impacted by other services.

One solution is to use Deep Packet Inspection (DPI) in a core network node such as a Gateway GPRS Service Node (GGSN) to identify which flows require a delay-sensitive target delay and which flows require a throughput-oriented delay. Multiple bearers can then be set up with different target delays, and traffic flows can be categorized into those bearers depending on the target delay requirement of each flow. This solution, however, has some disadvantages. The main disadvantage is that it requires the setup of additional bearers in addition to the default bearer, or throughput will be degraded even if Best Effort traffic is present. Setup of additional bearers presents additional disadvantages. First, it may be possible to set up additional bearers only for certain users (depending on configuration) or in certain network situations. For example, it is not possible to create new bearers during periods of high traffic load. Second, the signaling required for bearer setup and release may put extra, unwanted load on the system. Third, the latency resulting from the bearer setup and release process limits how quickly the various target delay settings can be installed.

Therefore, it would be advantageous to have a system and method for dynamically controlling throughput over the air interface that achieves the same improvement in the performance of the Uu interface between the mobile terminal and the Node B without setting up additional bearers. The present invention provides such a system and method.

In one embodiment, the present invention is directed to a computer-controlled method of dynamically controlling throughput over an air interface between a mobile terminal and a radio telecommunication system, wherein the radio telecommunication system includes a radio access network and a core network. The method includes the steps of receiving by a core network node, a plurality of traffic flows for the mobile terminal; determining by a packet inspection module, a target delay class for each traffic flow for the mobile terminal; and signaling by the core network node, the target delay class of each traffic flow to a Radio Network Controller (RNC) utilizing per-packet marking within a single radio access bearer (RAB).

The method may also include the steps of defining in the RNC, a separate virtual queue for each delay class on a per-RAB basis; instructing a Node B serving the mobile terminal to set up a separate, virtual queue in the Node B for each delay class on a per-RAB basis; and servicing the queues according to packet transmission delays associated with each queue, wherein a flow control mechanism in the Node B sets a packet queue length for each queue to optimize transmission performance.

In another embodiment, the present invention is directed to a core network node for dynamically controlling throughput over an air interface between a mobile terminal and a radio telecommunication system, wherein the radio telecommunication system includes a radio access network and a core network. The node includes means for receiving a plurality of traffic flows for the mobile terminal; means for obtaining from a packet inspection module, a target delay class for each traffic flow for the mobile terminal; and communication means for signaling the target delay class of each traffic flow to an RNC in the radio access network utilizing per-packet marking within a single RAB.

In another embodiment, the present invention is directed to an access network node for dynamically controlling throughput over an air interface between a mobile terminal and a radio telecommunication system, wherein the radio telecommunication system includes a radio access network and a core network. The access node includes means for obtaining a target delay class for each of a plurality of traffic flows for the mobile terminal; means for defining a separate, virtual queue for each delay class on a per-RAB basis; means for receiving from the core network, the plurality of traffic flows; means for identifying packets in the flows belonging to separate queues utilizing Logical Channel IDs for each delay class; and means for servicing the queues in accordance with transmission delays associated with each delay class.

In another embodiment, the present invention is directed to a system for dynamically controlling throughput over an air interface between a mobile terminal and a radio telecommunication system, wherein the radio telecommunication system includes a radio access network and a core network. The system includes a core network node and an access network node. The core network node includes means for receiving a plurality of traffic flows for the mobile terminal; means for obtaining from a packet inspection module, a target delay class for each traffic flow for the mobile terminal; and communication means for signaling the target delay class of each traffic flow to the access network node utilizing per-packet marking within a single radio access bearer (RAB). The access network node includes means for receiving from the core network node, the target delay class for each of the plurality of traffic flows for the mobile terminal; means for defining a separate, virtual queue for each delay class on a per-RAB basis; means for receiving from the core network node, the plurality of traffic flows; means for identifying packets in the flows belonging to separate queues utilizing Logical Channel IDs for each delay class; and means for servicing the queues in accordance with transmission delays associated with each delay class.

In another embodiment, the present invention is directed to a computer-controlled method in a Node B for controlling user-data flow from an RNC to the Node B. The method includes the steps of obtaining a target delay class for each of a plurality of traffic flows for a mobile terminal; defining a separate, virtual queue for each delay class on a per-RAB basis, wherein each queue is associated with a different logical channel; and controlling user-data flow from the RNC to the Node B independently for each virtual queue by sending a CAPACITY ALLOCATION control frame to the RNC, wherein the CAPACITY ALLOCATION control frame includes a plurality of High-Speed Downlink Shared Channel (HS-DSCH) Credit values, each Credit value being associated with a different logical channel.

The present invention improves the performance of the Uu interface between the mobile terminal and the Node B, providing improved delay and throughput performance without requiring additional bearer signaling (and UE involvement). The invention supports a mix of delay-sensitive and throughput-oriented traffic efficiently even when a secondary bearer cannot be set-up. The invention does not require any changes to industry standards, and can be readily introduced to the existing FC infrastructure.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

In order to dynamically select a target delay according to the type of service being utilized, a controlling node must first identify the type of service and its associated flow requirements. In one embodiment, this may be done by defining categories of services, i.e., delay-sensitive (low latency) flow, or throughput-oriented flow. Then, using Deep Packet Inspection (DPI) functionality in a core network node, the user traffic can be analyzed and classified into the categories above.

After this traffic-identification process is done, the controlling DPI node knows whether the user has delay-sensitive (low latency) traffic or not, and signals the RNC or the HSDPA FC entity in the Node B using per-packet marking within a single bearer. The RNC and the Node B keep multiple (virtual) queues per bearer and selectively put the various marked packet flows into these queues depending on the target delay requirement. Flow control is made aware of the separate queues and it can differentiate these queues. Packet scheduling between the different queues is applied in a way to implement different effective target delays for the various virtual queues.

Figure 1:
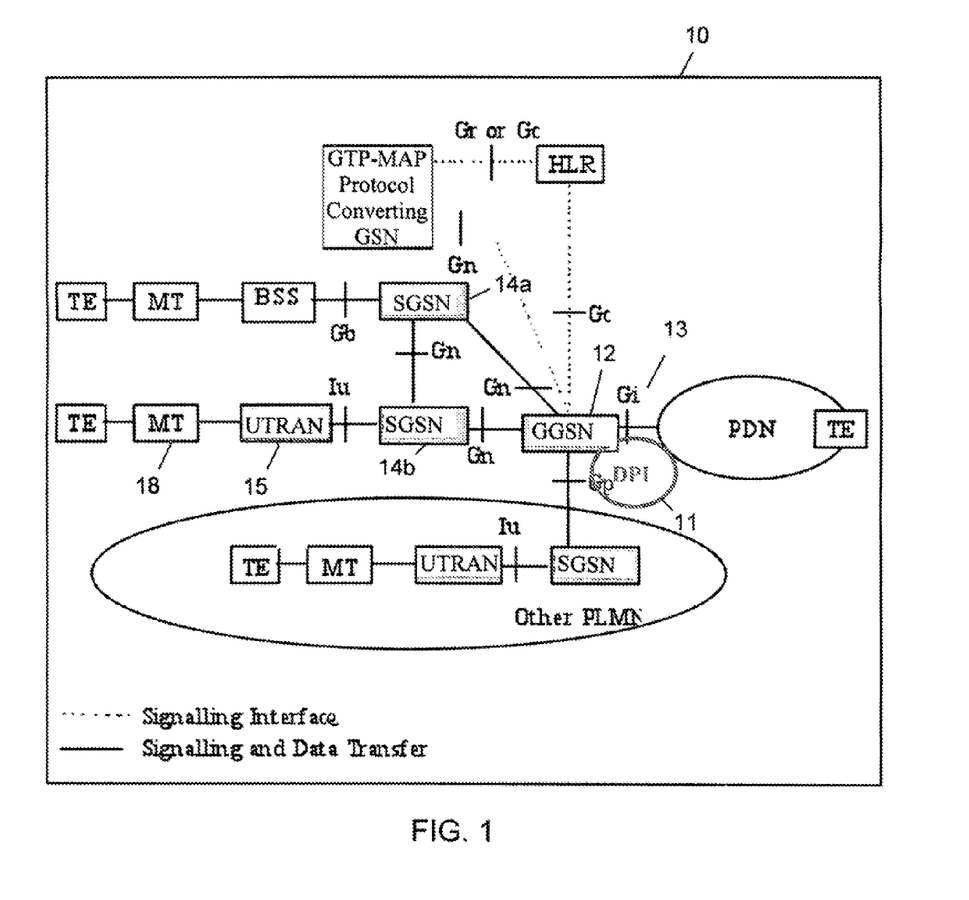
FIG. 1 is a simplified block diagram of a first exemplary embodiment of a telecommunication system architecture in which DPI functionality has been implemented in accordance with the teachings of the present invention.
Figure 4:
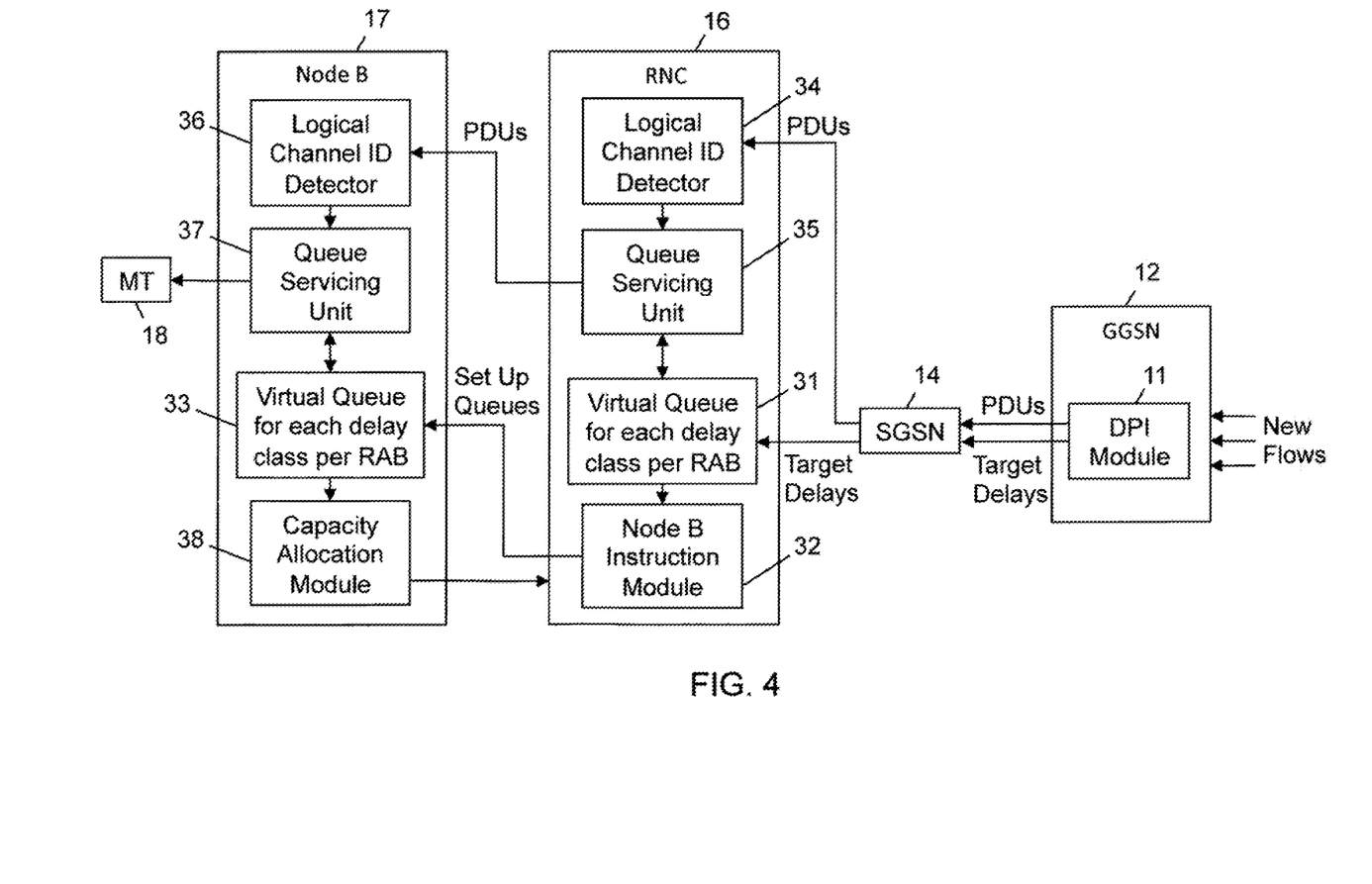
FIG. 4 is a simplified block diagram of an exemplary embodiment of the system of the present invention.

FIG. 1 is a simplified block diagram of a first exemplary embodiment of a telecommunication system architecture 10 in which a DPI module 11 has been implemented in accordance with the teachings of the present invention. The DPI module may be implemented, for example, either in the Gateway GPRS Support Node (GGSN) 12 or in a separate entity (not shown) on the Gi interface 13. The GGSN embodiment is preferred since the required GPRS Tunneling Protocol-Control (GTP-C) protocol is already part of the GGSN. The GTP-C protocol is used within the GPRS core network for signaling between the GGSN and Serving GPRS Support Nodes (SGSNs) 14a-14b. This allows each SGSN to activate a session on a user's behalf (user initiated PDP context activation), to deactivate the same session, to adjust quality of service parameters, or to update a session for a subscriber who has just arrived from another SGSN. The DPI module communicates with a radio access network such as the Universal Terrestrial Radio Access Network (UTRAN) 15. The UTRAN includes a Radio Network Controller (RNC) 16 and a Node B (base station) 17 for communicating with the mobile terminal (MT) 18, as shown in FIG. 4.

The DPI module 11 categorizes traffic (more specifically IP micro-flows) into one of two or more operator-defined delay classes, each having an assigned target delay. An IP micro-flow may be defined for example by a unique combination of source and destination IP addresses and port numbers along with the transport protocol value (called a five-tuple). While this is the most common way to define flows, the invention is not limited to this combination, and may utilize other combinations of header fields to define traffic flows. There is no limit on how many delay classes the operator can define, but a likely real-world number would be in the range of two to five delay classes.

The DPI module marks each packet according to the delay class of its IP micro-flow. Exemplary ways the packets can be marked include:

(1) Utilize the Diffserv Code Point (DSCP) field of the packet.

(2) Utilize the IPv6 flow label.

(3) Utilize any unused field of the IP header.

(4) Insert a new shim header before the IP packet to indicate the traffic class.

(5) Utilize a newly defined GTP extension field, or overload an existing GTP field, such as the Tunnel Endpoint Identifier (TEID).

(6) Utilize a node-internal encapsulation format if the DPI module is co-located with the RNC (inside the UTRAN 15 in FIG. 1).

In the RNC, a separate (virtual) queue is defined for each delay class on a per-bearer basis. In one embodiment, these queues may be dynamically created/destroyed as packets marked with various delay classes arrive at the RNC. That is, a queue for a particular delay class can be created on demand when the first packet of that delay class arrives on the bearer. The queue can be destroyed when it becomes empty, or when it has remained empty for a defined period of time. A scheduling mechanism and, optionally, an Active Queue Management mechanism may be introduced for the RNC.

Along with the separate virtual queues, the RNC also instructs the Node B to set up a separate queue. This may be done, for example, either by introducing a specific new Node B Application Part (NBAP) message, or by setting a different Logical Channel ID and letting the Node B set up the required queue on demand. Note that after setting up the new queue, Packet Data Units (PDUs) belonging to separate queues can be identified by different Logical Channel IDs. The first option allows virtual bearers to be set up with different parameters, but introduces extra delay due to the NBAP signaling. The second option requires virtual bearer parameters to be set up in advance for the different Logical Channel IDs, but does not introduce extra delay due to NBAP signaling. There are fifteen possible different Logical Channels, which should be sufficient to map different requirements.

The Node B services queues according to packet transmission delay. For example, the Node B may service low-delay (virtual) queues first. However, care should be taken not to fully starve the low-delay queues either. Based on the length of different queues, the Flow Control algorithm in the Node B can judge how much data is needed for each queue to get optimal performance. Based on such decisions, new fields can be introduced to the CAPACITY ALLOCATION control frame defined in 3GPP TS 25.435 V9.2.0 (2010-06), defining a lower limit to the number of PDUs that can be sent on different Logical Channels.

The High-Speed Downlink Shared Channel (HS-DSCH) Frame Protocol (FP) provides the flow control mechanism utilizing two control messages on the Iub interface. The first is the HS-DSCH CAPACITY REQUEST message sent from the RNC to the Node B to request HS-DSCH capacity from the Node B. The second is the CAPACITY ALLOCATION message sent from the Node B to the RNC to control user-data flow from the RNC to the Node B. This message can be sent at any time. The Node B uses the Credit Information Element (IE) to indicate the number of MAC-d PDUs that the RNC may transmit during one HS-DSCH interval. If the HS-DSCH Credit IE has a value of zero (0), it signifies there are no resources in the Node B allocated for transmission, so the RNC should stop the flow. Varying values of the HS-DSCH Credit IE indicate varying capacities up to a maximum value of 2,047, which indicates unlimited capacity for the transmission of PDUs.

Figure 2:
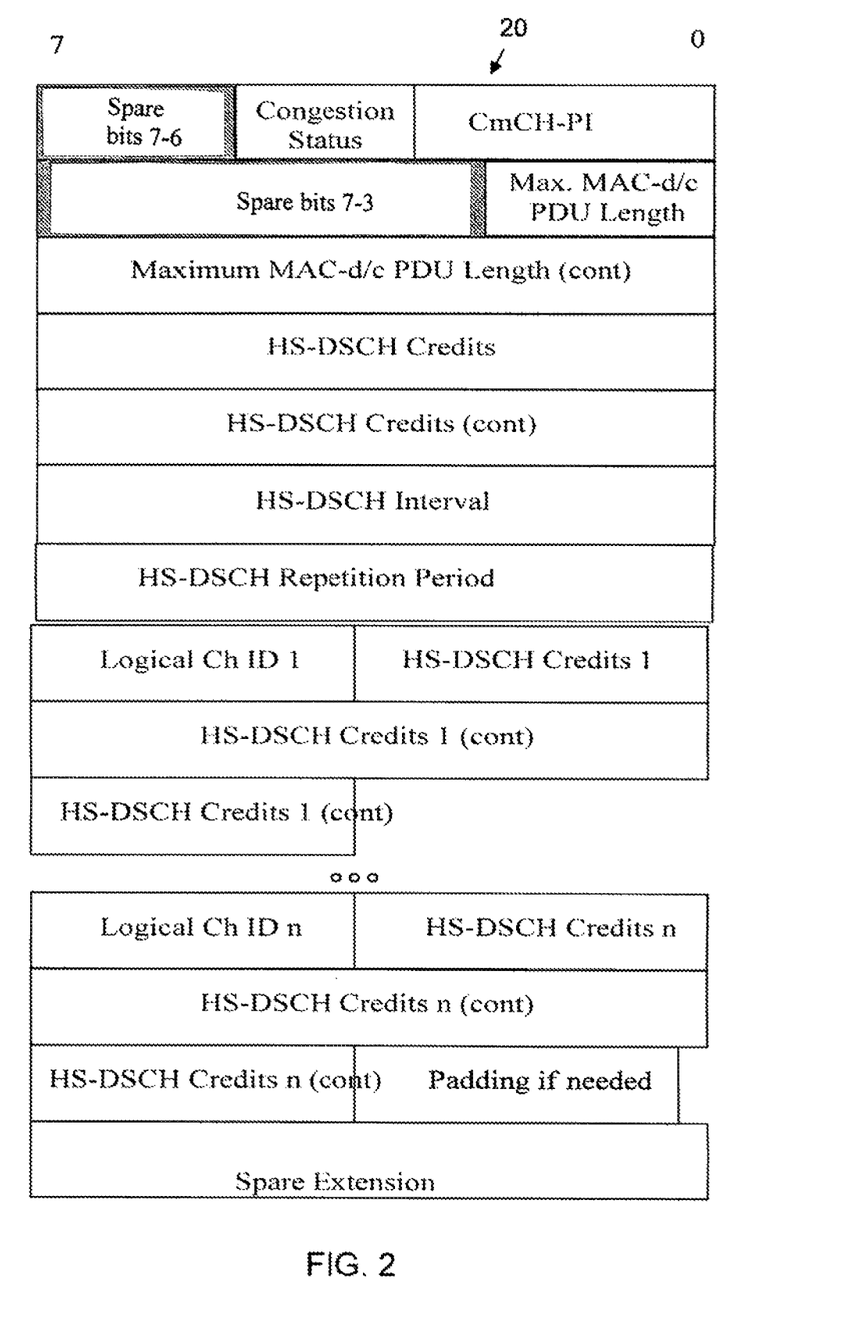
FIG. 2 is an illustration of the fields of the CAPACITY ALLOCATION control frame as modified in an exemplary embodiment of the present invention.

FIG. 2 is an illustration of the fields of a CAPACITY ALLOCATION control frame 20 as modified in an exemplary embodiment of the present invention. In addition to the original fields of the control frame, different HS-DSCH Credit values are indicated for different logical channels. HS-DSCH Credit i values assigned to different logical channels must be smaller than the HS-DSCH Credit value in the main part of the control frame (i.e., the first credit value in the standardized part of the CAPACITY ALLOCATION frame). Only logical channels where the Credit i is smaller than HS-DSCH Credit (for the entire bearer) need to be indicated in the extension.

The credit limit for each logical channel may be applied directly or hierarchically. The choice may be signaled or configured. If the credit limit is directly applied, no more PDUs than defined by the HS-DSCH Credit value can be sent for the entire flow, and no more PDUs than defined by the HS-DSCH Credit i value for Logical Channel i. If the credit limit is hierarchically applied, the previous HS-DSCH Credit i values also limit the credits for a Logical Channel listed later in the control frame. For example:

HS-DSCH Credit=100
Logical channel 1 ID=5
HS-DSCH Credit 1=10
Logical channel 2 ID=6
HS-DSCH Credit 2=50

If 10 frames are sent on Logical Channel 1 (ID 5), then a maximum of 40 frames can be sent on Logical Channel 2 (ID 6). The HS-DSCH Credit value limits the total number of PDUs that can be sent on the bearers.

Figure 3:
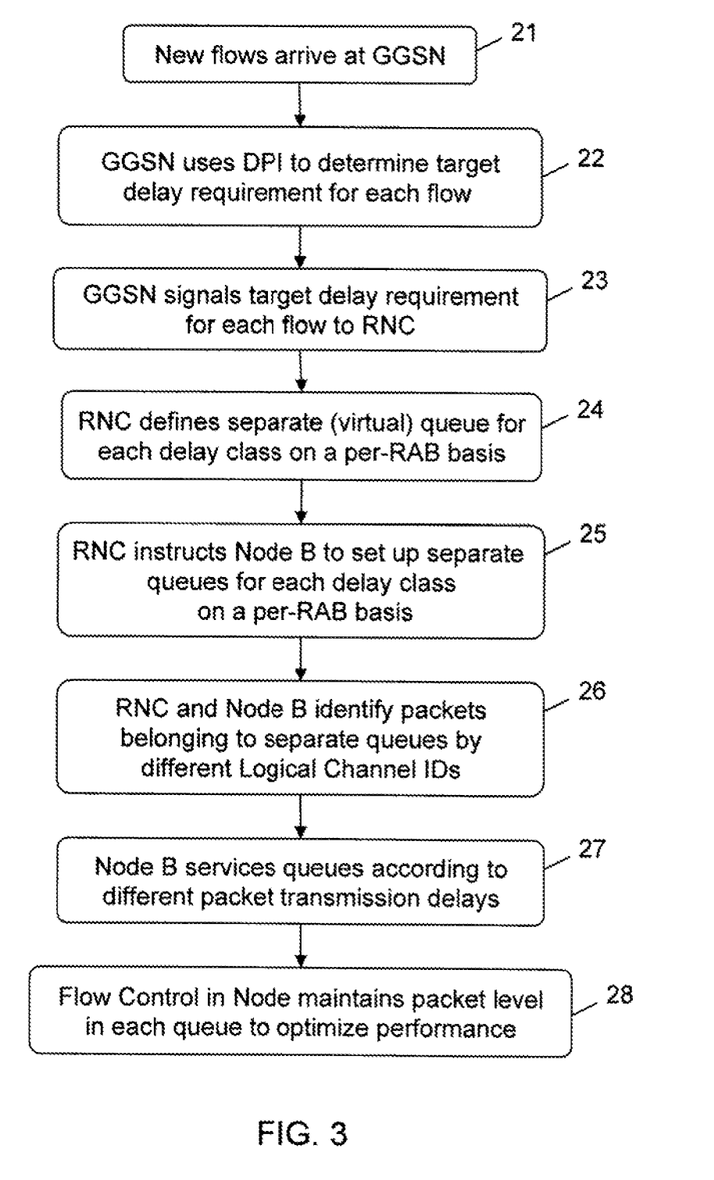
FIG. 3 is a flow chart illustrating the steps of an exemplary embodiment of the method of the present invention.

FIG. 3 is a flow chart illustrating the steps of an exemplary embodiment of the method of the present invention. At step 21, new flows for a mobile terminal arrive at a core network node such as the GGSN 12 having a DPI module 11 installed. At step 22, the GGSN uses DPI to examine the new flows and determine the target delay requirement for each individual flow. At step 23, the GGSN signals the target delay requirement for each flow to the RNC. At step 24, the RNC defines a separate (virtual) queue for each delay class on a per-RAB basis. At step 25, the RNC instructs the Node B to set up separate queues for each delay class on a per-RAB basis. At step 26, the RNC and Node B identify packets belonging to separate queues by detecting different Logical Channel IDs. At step 27, the Node B services queues according to the different packet transmission delays. At step 28, the Flow Control algorithm in the Node B maintains the packet queue length for each queue to optimize transmission performance.

FIG. 4 is a simplified block diagram of an exemplary embodiment of the system of the present invention. Illustrated are the GGSN 12, SGSN 14, RNC 16, Node B 17, and MT 18. When new flows for the MT arrive at the GGSN, the GGSN uses the DPI module 11 to examine the new flows and determine the target delay requirement for each individual flow. The GGSN signals the target delay requirements for each of the flows to the RNC. The RNC defines a separate (virtual) queue 31 for each delay class on a per-RAB basis. A Node B Instruction module 32 instructs the Node B to set up separate queues 33 for each delay class on a per-RAB basis.

The GGSN 12 routes the PDUs from the flows to the RNC 16 where a Logical Channel ID detector 34 identifies packets belonging to separate queues by detecting different Logical Channel IDs. A Queue Servicing Unit 35 in the RNC forwards the PDUs to the correct Node B 17 where a Logical Channel ID detector 36 identifies packets belonging to separate queues by detecting different Logical Channel IDs. A Queue Servicing Unit 37 in the Node B forwards the PDUs to the correct MT 18. The Queue Servicing Unit 37 in the Node B services queues according to the different packet transmission delays. The Flow Control algorithm in the Node B maintains the packet level in each queue to optimize transmission performance.

The Node B 17 is also shown to include a Capacity Allocation module 38. The Capacity Allocation module generates the CAPACITY ALLOCATION message 20 of FIG. 2, which is sent from the Node B to the RNC 16 to control user-data flow from the RNC to the Node B.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A computer-controlled method of dynamically controlling throughput over an air interface between a mobile terminal and a radio telecommunication system, wherein the radio telecommunication system includes a radio access network and a core network, the method comprising the steps of:
   receiving by a core network node, a plurality of traffic flows for the mobile terminal;
   determining by a packet inspection module, a target delay class for each traffic flow for the mobile terminal; and
   signaling by the core network node, the target delay class of each traffic flow to a Radio Network Controller (RNC) utilizing per-packet marking within a single radio access bearer (RAB).

2. The method according to claim 1, wherein the step of determining a target delay class for each traffic flow is performed by a Deep Packet Inspection (DPI) module in a Gateway GPRS Support Node (GGSN).

3. The method according to claim 1, wherein the step of determining a target delay class for each traffic flow is performed by a Deep Packet Inspection (DPI) module implemented in an entity on a Gi interface between a Gateway GPRS Support Node (GGSN) and a packet data network.

4. The method according to claim 1, wherein the step of signaling the target delay class of each traffic flow includes indicating a delay class in a header field of the packets in each traffic flow, wherein the header field is selected from a group consisting of:
   a Diffsery Code Point (DSCP) field;
   an Internet Protocol version 6 (IPv6) field;
   a new shim header inserted before each packet;
   a newly defined GPRS Tunneling Protocol (GTP) extension field;
   an overloaded existing GTP field; and
   any other unused field of the packet header.

5. The method according to claim 1, wherein the step of determining a target delay class for each traffic flow is performed by a Deep Packet Inspection (DPI) module co-located with the RNC, and wherein the step of signaling the target delay class of each traffic flow includes indicating a delay class to the RNC utilizing a node-internal encapsulation format.

6. The method according to claim 1, further comprising the step of defining a separate, virtual queue in the RNC for each delay class on a per-RAB basis.

7. The method according to claim 1, further comprising the step of the RNC instructing a Node B serving the mobile terminal to set up a separate, virtual queue in the Node B for each delay class on a per-RAB basis.

8. The method according to claim 7, wherein the step of the RNC instructing the Node B includes sending an instruction to the Node B in a new Node B Application Part (NBAP) message.

9. The method according to claim 7, wherein the step of the RNC instructing the Node B includes:
   setting up virtual bearer parameters in the Node B in advance for different Logical Channel IDs; and
   setting a different Logical Channel ID for each delay class;
   wherein the Node B sets up the required queues on demand.

10. The method according to claim 9, further comprising the RNC and Node B identifying packets belonging to separate queues utilizing the Logical Channel IDs.

11. The method according to claim 10, further comprising the Node B servicing the queues according to packet transmission delays associated with each queue, wherein a flow control mechanism in the Node B sets a packet queue length for each queue to optimize transmission performance.

12. A core network node for dynamically controlling throughput over an air interface between a mobile terminal and a radio telecommunication system, wherein the radio telecommunication system includes a radio access network and a core network, the node comprising:
   means for receiving a plurality of traffic flows for the mobile terminal;
   means for obtaining from a packet inspection module, a target delay class for each traffic flow for the mobile terminal; and
   communication means for signaling the target delay class of each traffic flow to a Radio Network Controller (RNC) in the radio access network utilizing per-packet marking within a single radio access bearer (RAB).

13. The core network node according to claim 12, wherein the core network node is a Gateway GPRS Support Node (GGSN) and the packet inspection module is a Deep Packet Inspection (DPI) module in the GGSN.

14. The core network node according to claim 12, wherein the core network node is a Gateway GPRS Support Node (GGSN) and the means for obtaining a target delay class for each traffic flow includes means for interfacing with a Deep Packet Inspection (DPI) engine implemented as an entity on a Gi interface between the GGSN and a packet data network.

15. The core network node according to claim 12, wherein the communication means includes means for indicating a delay class in a header field of the packets in each traffic flow, wherein the header field is selected from a group consisting of:
   a Diffsery Code Point (DSCP) field;
   an Internet Protocol version 6 (IPv6) field;
   a new shim header inserted before each packet;
   a newly defined GPRS Tunneling Protocol (GTP) extension field;
   an overloaded existing GTP field; and
   any other unused field of the packet header.

16. An access network node for dynamically controlling throughput over an air interface between a mobile terminal and a radio telecommunication system, wherein the radio telecommunication system includes a radio access network and a core network, the node comprising:
   means for obtaining a target delay class for each of a plurality of traffic flows for the mobile terminal;
   means for defining a separate, virtual queue for each delay class on a per-RAB basis;
   means for receiving from the core network, the plurality of traffic flows;

means for identifying packets in the flows belonging to separate queues utilizing Logical Channel IDs for each delay class; and means for servicing the queues in accordance with transmission delays associated with each delay class.

17. The access network node according to claim 16, wherein the means for obtaining a target delay class for each of a plurality of traffic flows includes means for receiving packets from the core network, wherein the target delay class of each traffic flow is indicated in a header field of the packets, and the header field is selected from a group consisting of:
a Diffsery Code Point (DSCP) field;
an Internet Protocol version 6 (IPv6) field;
a new shim header inserted before each packet;
a newly defined GPRS Tunneling Protocol (GTP) extension field;
an overloaded existing GTP field; and
any other unused field of the packet header.

18. The access network node according to claim 16, wherein the means for obtaining a target delay class for each traffic flow includes a Deep Packet Inspection (DPI) module co-located with the access network node.

19. The access network node according to claim 16, wherein the access network node is a Node B, and the Node B further comprises means for controlling user-data flow from a Radio Network Controller (RNC) to the Node B independently for each logical channel.

20. The access network node according to claim 19, wherein the means for controlling user-data flow from the RNC to the Node B includes means for sending a CAPACITY ALLOCATION control frame to the RNC, wherein the CAPACITY ALLOCATION control frame includes a plurality of High-Speed Downlink Shared Channel (HS-DSCH) Credit values, each Credit value being associated with a different logical channel.

21. A system for dynamically controlling throughput over an air interface between a mobile terminal and a radio telecommunication system, wherein the radio telecommunication system includes a radio access network and a core network, the system comprising:
a core network node; and
an access network node;
wherein the core network node includes:
    means for receiving a plurality of traffic flows for the mobile terminal;
    means for obtaining from a packet inspection module, a target delay class for each traffic flow for the mobile terminal; and
    communication means for signaling the target delay class of each traffic flow to the access network node utilizing per-packet marking within a single radio access bearer (RAB); and
wherein the access network node includes:
    means for receiving from the core network node, the target delay class for each of the plurality of traffic flows for the mobile terminal;
    means for defining a separate, virtual queue for each delay class on a per-RAB basis;
    means for receiving from the core network node, the plurality of traffic flows;
    means for identifying packets in the flows belonging to separate queues utilizing Logical Channel IDs for each delay class; and
    means for servicing the queues in accordance with transmission delays associated with each delay class.

22. The system according to claim 21, wherein the core network node is a Gateway GPRS Support Node (GGSN) and the packet inspection module is a Deep Packet Inspection (DPI) module.

23. The system according to claim 21, wherein the communication means in the core network node includes means for indicating a delay class in a header field of the packets in each traffic flow, wherein the header field is selected from a group consisting of:
a Diffsery Code Point (DSCP) field;
an Internet Protocol version 6 (IPv6) field;
a new shim header inserted before each packet;
a newly defined GPRS Tunneling Protocol (GTP) extension field;
an overloaded existing GTP field; and
any other unused field of the packet header.

24. The system according to claim 21, wherein the access network node is a Radio Network Controller (RNC), and the RNC includes means for instructing a Node B serving the mobile terminal to set up a separate, virtual queue in the Node B for each delay class on a per-RAB basis.

25. The system according to claim 24, wherein the RNC and Node B include means for identifying packets belonging to separate queues utilizing Logical Channel IDs for each delay class.

26. A computer-controlled method in a Node B for controlling user-data flow from a Radio Network Controller (RNC) to the Node B, the method comprising the steps of:
    obtaining a target delay class for each of a plurality of traffic flows for a mobile terminal;
    defining a separate, virtual queue for each delay class on a per-Radio Access Bearer (RAB) basis, wherein each queue is associated with a different logical channel; and
    controlling user-data flow from the RNC to the Node B independently for each virtual queue by sending a CAPACITY ALLOCATION control frame to the RNC, wherein the CAPACITY ALLOCATION control frame includes a plurality of High-Speed Downlink Shared Channel (HS-DSCH) Credit values, each Credit value being associated with a different logical channel.

* * * * *

UNITED STATES PATENT AND TRADEMARK OFFICE
CERTIFICATE OF CORRECTION

PATENT NO.      : 8,565,091 B2
APPLICATION NO. : 12/914161
DATED           : October 22, 2013
INVENTOR(S)     : Pongracz et al.

It is certified that error appears in the above-identified patent and that said Letters Patent is hereby corrected as shown below:

In the Claims

Column 7, Line 47, in Claim 4, delete "Diffsery" and insert -- Diffserv --, therefor.

Column 8, Line 50, in Claim 15, delete "Diffsery" and insert -- Diffserv --, therefor.

Column 9, Line 12, in Claim 17, delete "Diffsery" and insert -- Diffserv --, therefor.

Column 10, Line 22, in Claim 23, delete "Diffsery" and insert -- Diffserv --, therefor.

Signed and Sealed this
Eleventh Day of March, 2014

Michelle K. Lee
*Deputy Director of the United States Patent and Trademark Office*